United States Patent [19]
Dueck

[11] Patent Number: 4,967,728
[45] Date of Patent: Nov. 6, 1990

[54] HUMIDIFIER APPARATUS

[76] Inventor: Art W. Dueck, Box 98, Rosthern, Sask., Canada, S0K3R0

[21] Appl. No.: 451,603

[22] Filed: Dec. 18, 1989

[51] Int. Cl.⁵ .............................................. F24F 3/14
[52] U.S. Cl. ................................ 126/113; 236/44 A; 261/DIG. 34
[58] Field of Search ..................... 236/44 A; 126/113; 261/DIG. 34

[56] References Cited

U.S. PATENT DOCUMENTS 3,510,252 5/1970 Reich .......................... 261/DIG. 34
3,635,210 1/1972 Morrow ..........................236/44 A X Primary Examiner—William E. Wayner
Attorney, Agent, or Firm—Leon Gilden

[57] ABSTRACT

An apparatus is set forth for humidification of a dwelling wherein a transparent housing includes a valve operative through a solenoid with a flexible input water line directed into the valve and a flexible output line directed from the valve to a spray head. The valve is associated with a humidistat to effect operation of the valve to inject water vapor into a stream of air directed within a central duct work of a furnace arrangement. The spray head includes a horizontal and vertical pivot mount in association with the water input line to enable selective positioning of the nozzle at a desired rotation relative to the air stream within the duct work. Modifications of the instant invention include removable and selectively cleansable sponge coverings for the spray nozzle head.

7 Claims, 4 Drawing Sheets

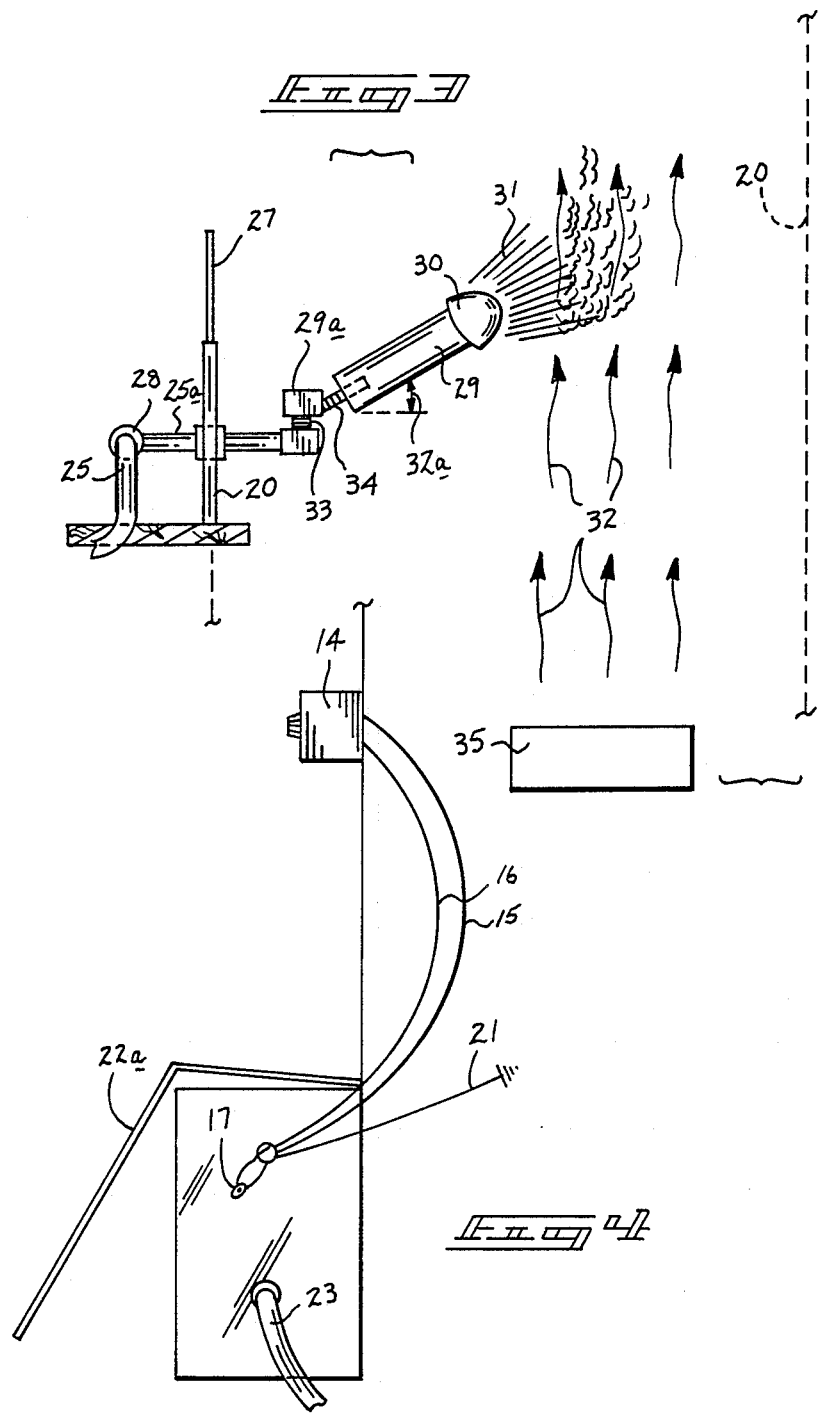

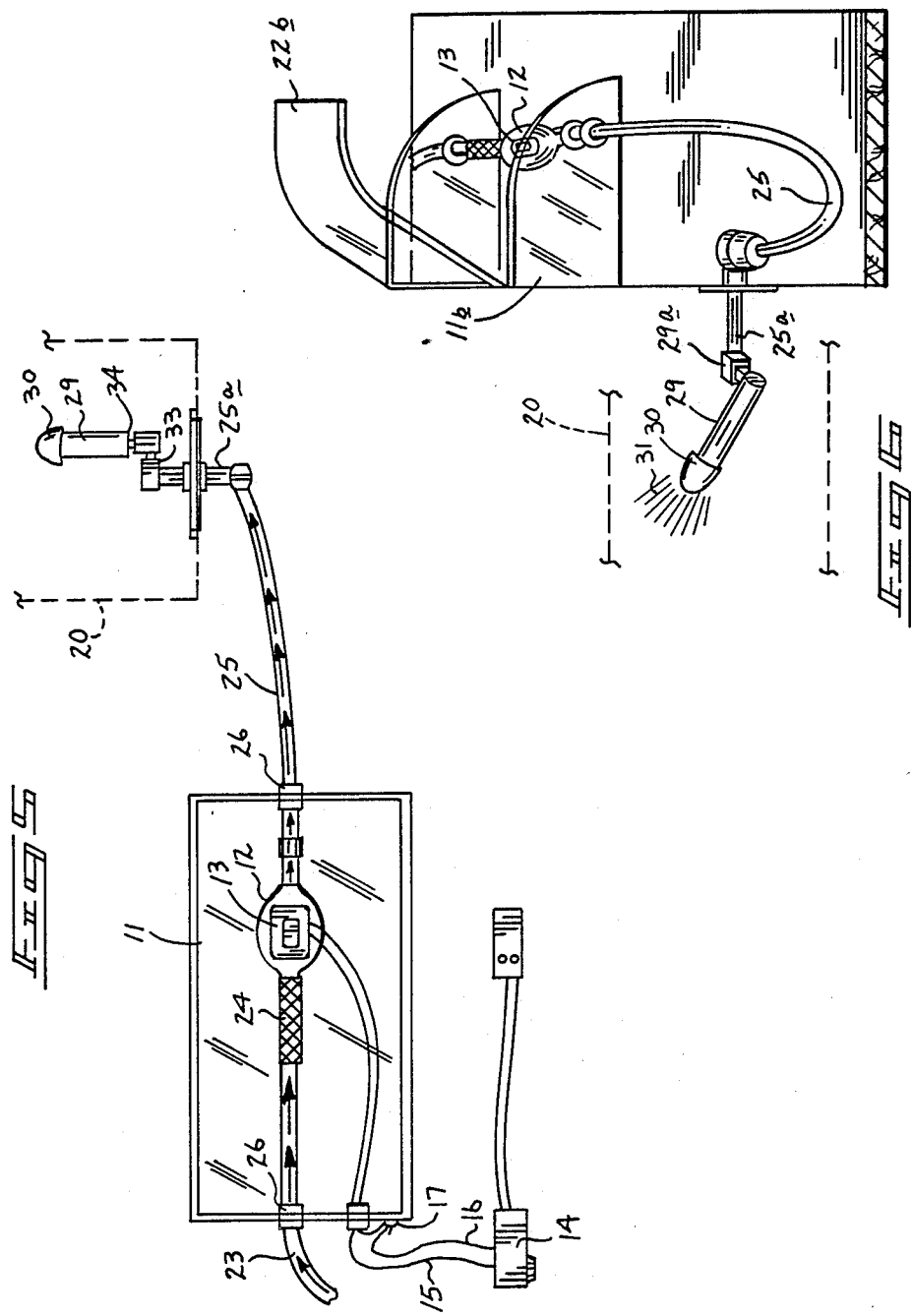

HUMIDIFIER APPARATUS

BACKGROUND OF THE INVENTION

1. Field of the Invention

The field of invention relates to humidifier apparatus, and more particularly pertains to a new and improved humidifier apparatus wherein the same is readily and selectively securable in association with an existing duct work of a dwelling furnace arrangement.

2. Description of the Prior Art

Humidifier apparatus to elevate relative humidity within a dwelling is known in the prior art. Such apparatus is desirable particularly during wintery months to elevate relative humidity within a dwelling for enhanced comfort and well being of inhabitants of the dwelling. Examples of the prior art include Stuckey U.S. Pat. No. 4,056,049 to wherein humidifier housing is arranged overlying an outlet duct work, wherein a baffling within the housing directs heated air over a water level, wherein the air directs moisture from the water level into the dwelling.

Claytor U.S. Pat. No. 4,338,859 to sets forth a humidifier type apparatus wherein a reservoir is mounted adjacent a duct work, wherein the reservoir includes open sides, wherein heated air directed through the reservoir directs moisture interiorly of the dwelling from the reservoir.

Drager U.S. Pat. No. 2,681,609 sets forth a floor mounted air conditioning unit wherein an underlying fan draws moisture from underlying pads, wherein the drawing of moisture through the pads effects a cooling thereof for enhanced cooling within the environment of the unit.

Frost U.S. Pat. No. 3,158,081 sets forth an air treatment system for use with a furnace wherein a spray nozzle positioned exteriorly of a duct work directs a predetermined spray orthogonally relative to the duct work to introduce moisture into the air stream.

Lewis U.S. Pat. No. 966,842 sets forth a reservoir supply mounted underlying an outlet register, wherein air directed about the reservoir will draw moisture therefrom and into a dwelling associated with the register.

As such, it may be appreciated that there is a need for a new and improved humidifier apparatus wherein the same addresses both the problems of ease of use and installation to an existing furnace duct work and effectiveness in directing moisture into air to be directed interiorly of a dwelling associated with the furnace structure and in this respect, the present invention substantially fulfills this need.

SUMMARY OF THE INVENTION

In view of the foregoing disadvantages inherent in the known types of humidifier apparatus now present in the prior art, the present invention provides a humidifier apparatus wherein the same includes an easily retrofitted humidifier system to an existing furnace and duct work system and further includes appropriate valving and effective filtration to minimize clogging and enhance effectiveness in prolonged use of the organization. As such, the general purpose of the present invention, which will be described subsequently in greater detail, is to provide a new and improved humidifier apparatus which has all the advantages of the prior art humidifier apparatus and none of the disadvantages.

To attain this, the present invention includes an apparatus for humidification of a dwelling wherein a transparent housing includes a valve operative through a solenoid with a flexible input water line directed into the valve and a flexible output line directed from the valve to a spray head. The valve is associated with a humidistat to effect operation of the valve to inject water vapor into a stream of air directed within a central duct work of a furnace arrangement. The spray head includes a horizontal and vertical pivot mount in association with the water input line to enable selective positioning of the nozzle at a desired rotation relative to the air stream within the duct work. Modifications of the instant invention include removable and selectively cleansable sponge coverings for the spray nozzle head.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved humidifier apparatus which has all the advantages of the prior art humidifier apparatus and none of the disadvantages.

It is another object of the present invention to provide a new and improved humidifier apparatus which may be easily and efficiently manufactured and marketed.

It is a further object of the present invention to provide a new and improved humidifier apparatus which is of a durable and reliable construction.

An even further object of the present invention is to provide a new and improved humidifier apparatus which is susceptible of a low cost of manufacture with regard to both materials and labor, and which accordingly is then susceptible of low prices of sale to the consuming public, thereby making such humidifier apparatus economically available to the buying public.

Still yet another object of the present invention is to provide a new and improved humidifier apparatus which provides in the apparatuses and methods of the prior art some of the advantages thereof, while simultaneously overcoming some of the disadvantages normally associated therewith.

Still another object of the present invention is to provide a new and improved humidifier apparatus wherein the same is readily securable to an existing duct work and adjustably mounted relative thereto for directing predetermined pulses of moisture into air directed within the duct work.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view taken in elevation of the spray head in association with air flow within an associated duct work.

FIG. 4 is an orthographic side view of a transparent housing utilized by the instant invention.

FIG. 5 is a top orthographic view of the instant invention.

FIG. 6 is a top orthographic view illustrating a modified housing in association with the valving of the instant invention.

DESCRIPTION OF THE PREFERRED EMBODIMENT

Figure 1:
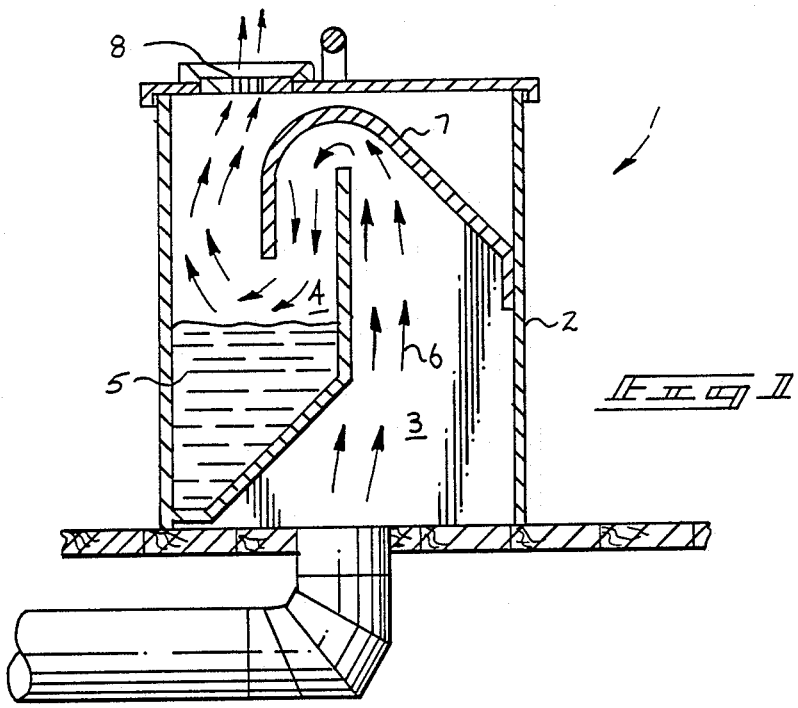
FIG. 1 is an orthographic cross-sectional view of a prior art humidifier apparatus.

With reference now to the drawings, and in particular to FIGS. 1 to 8 thereof, a new and improved humidifier apparatus embodying the principles and concepts of the present invention and generally designated by the reference numeral 10 will be described.

FIG. 1 illustrates a prior art humidifier organization 1 wherein a housing 2 defined with a first air chamber 3 adjacent a water chamber 4 includes a water level 5 within the water chamber, wherein a flow of air 6 directed from the air chamber 3 to the water chamber 4 through a baffle 7 draws moisture from the water level 5 through a register 8 into a dwelling to elevate humidity therewithin.

More specifically, the humidifier apparatus 10 of the instant invention essentially comprises a transparent housing 11 contained therewithin a solenoid valve 12 operated by an electrical solenoid 13. The solenoid 13 is actuated by an adjustable humidistat 14. First and second respective electrical transmission lines 15 and 16 are associated from the humidistat 14 to the solenoid 13 to actuate the solenoid 13 and associated solenoid valve upon relative humidity within a dwelling descending to a predetermined level. An on/off switch 17 mounted to the housing is operative to electrically engage the solenoid 13 for repair or replacement thereof. A respective third and fourth electrical line 18 and 19 directed from the humidistat 14 are directed to an associated fan or blower motor source 35 (see FIG. 3) to direct a quantity of forced air past a nozzle associated with the apparatus. Further it is noted that a ground wire 21 from the solenoid 13 is provided for safety in its use.

A central furnace duct 20 houses the nozzle of the instant invention identified by the spray conduit 29 coaxially aligned with an ellipsoidal spray head 30. A transparent access door 22 is mounted in alignment with the spray head 30 for visual observation of its operation in use.

The transparent housing 11 includes a flexible water input line 23 directed thereto and coupled to the valve 12 by a first water connector 26 originally mounted to a side of the housing, and further including a flexible water output line 25 coupled forwardly of the valve 12 to associate the valve 12 with the duct water connector 28. The duct water connector 28 includes a rigid output pipe 25a therefrom to the spray conduit 29. The flexible input and output lines 23 and 25 respectively enable positioning of the housing 11, as conveniently and geometrically available within a dwelling to accommodate positioning of the nozzle defined by the spray conduit 29 and the spray head 30 within the associated furnace duct work 20. It is noted, as illustrated in FIG. 3 for example, that it is desirable that the coaxially aligned conduit 29 and the spray head 30 be oriented at an acute angle displaced from an orthogonal orientation of the ellipsoidal spray head 30 relative to the forced air direction 32. The spray head 30 includes a vertically rotatable pipe 33 to rotate the pipe 33 relative to the rigid output pipe 25a, with a horizontally rotatable pipe 34 mounted to a directional box 29a to horizontally enable rotation of the nozzle 30 relative to the vertically rotatable pipe 33 to enable adjustment of the nozzle 30 in a direction orthogonal to the flow of air 32 and then enable rotation of the nozzle 30 upwardly to adjust the nozzle 30 at an acute angle as noted above. In this manner, the water spray 31 includes a vector in alignment with the forced air direction 32 to enhance the water spray transport with the forced air direction through the duct work.

Figure 2:
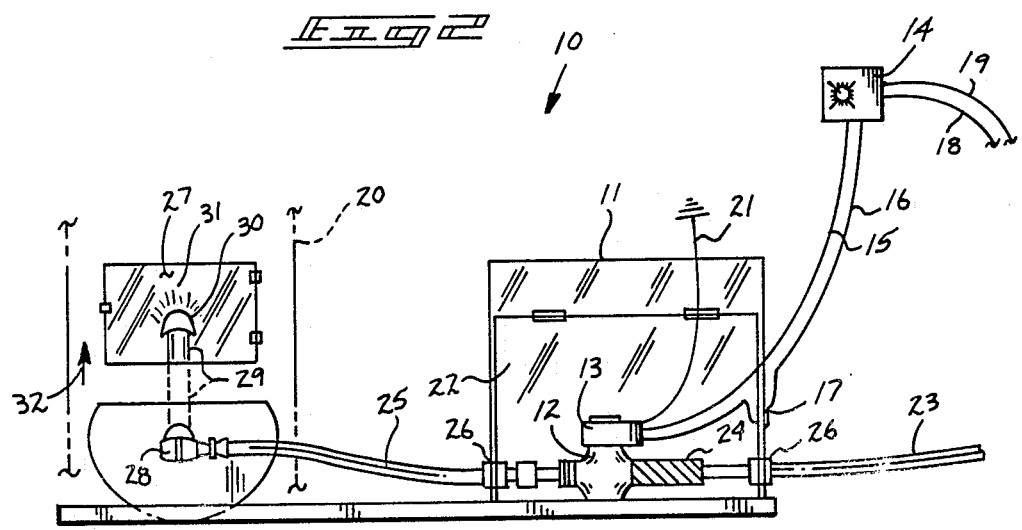
FIG. 2 is an orthographic view taken in elevation of the instant invention.

The housing 11, as illustrated in FIG. 2 and in FIG. 4, includes a transparent access door 22 and 22a respectively to enable access to the solenoid and valving, wherein FIG. 6 is illustrative of a further housing 11b with an arcuate access door 22b that is utilized in areas of limited area to accommodate the housing.

Figure 7:
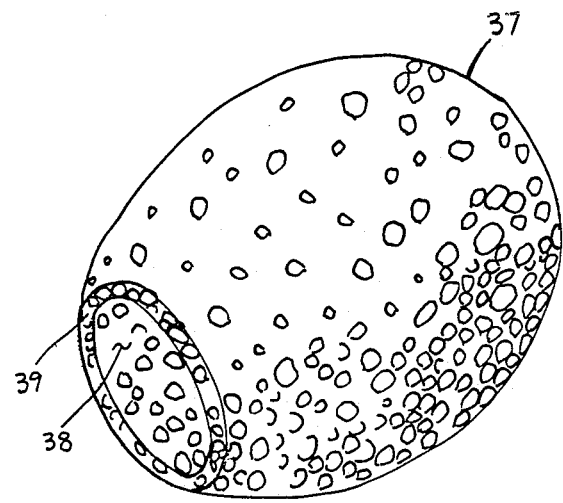
FIG. 7 is an isometric illustration of a nozzle head covering utilized by the instant invention.
Figure 8:
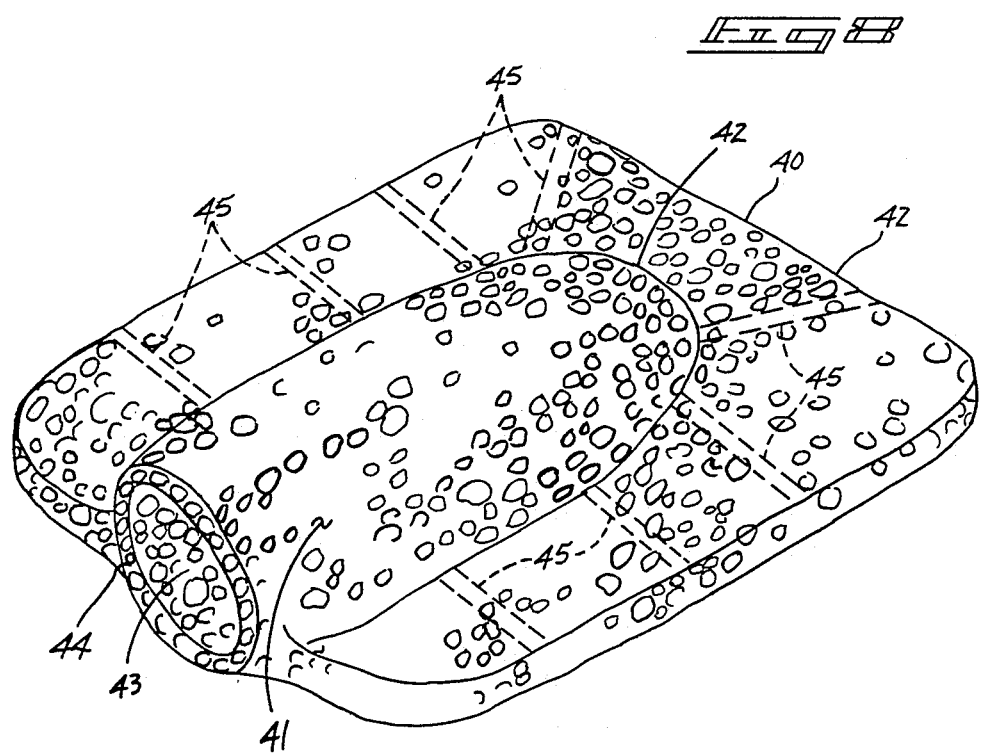
FIG. 8 is an isometric illustration of a further nozzle head covering utilized by the instant invention.

FIGS. 7 and 8 illustrate a respective first and second spray head cover 37 and 40, each formed of a sponge-like material, wherein the covering of the first spray head cover 37 is of a generally ellipsoidal configuration complementary to that of the spray head 30 and includes an opening 38 defined by a resilient perimeter 39 to resiliently encompass the spray conduit 29 when the spray head 30 is positioned within the first spray head cover 37. The covers 37 and 40 enable moisture to enter the air stream by absorption thereof from air passing through and about the covers. The covers provide enhanced surface area to enable enhanced absorption of moisture, particularly of the cover as illustrated in FIG. 8, wherein the second spray head cover 40 includes an elongate cylindrical cover portion 41 including a tapered forward end 42 to receive the nozzle therewithin.

The opening 43 includes a resilient perimeter 44 to encompass an enlarged portion of the spray conduit 29 and thereby introduce an enlarged surface area as the sponge-like material within the second cover 42 absorbs moisture from delivery through the spray head 30 for introduction into the air stream of the duct work. A planar fan-like rib 42 is diametrically aligned with the axis of the cylindrical cover 41 and includes a series of rigid ribs 45 mounted therethrough to maintain the planar configuration of the fan-like rib 42 and its directing of moisture into the forced air direction 32 when utilized in conjunction with the spray head 30 and spray conduit 39, as illustrated in FIG. 3.

Further, the valve 12 includes a replaceable in-line filter 24 positioned between the input line 23 and the valve 12 interiorly of the housing 11, wherein the filter 24 is provided to remove scale, lime, and debris from entering the valve 12 and subsequently the spray head 30 and thereby minimize obstruction within the spray head 30 and attendent loss of efficiency of the organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A humidifier apparatus in combination with a forced air duct, and a fan means operably associated with the duct to direct forced air therethrough, the apparatus comprising, a housing enclosure including a solenoid valve fixedly mounted therein, and a humidistat mounted exteriorly of the housing enclosure for opening the valve upon sensing of a predetermined relative humidity, and the humidistat means further electrically associated with the fan to actuate the fan upon simultaneous opening of the solenoid valve, and a fluid input conduit directing fluid to the solenoid valve, and an output conduit directing fluid from the solenoid valve, and a nozzle means mounted in the duct coupled to the output conduit remote from the solenoid valve, and wherein the input conduit and the output conduit are each flexible to enable repositioning of the housing closure relative to the duct, and wherein the housing enclosure is transparent, and wherein the duct includes a transparent access door positioned adjacent the nozzle means to enable visual observation of the nozzle means and access thereof.

2. A humidifier apparatus as set forth in claim 1 wherein the nozzle means includes a rigid further output conduit securing the nozzle means to the output conduit, and the nozzle means includes a cylindrical spray conduit, and an ellipsoidal spray head axially aligned with the spray conduit mounted thereon, and the spray conduit is adjustably mounted to the rigid conduit.

3. A humidifier apparatus as set forth in claim 2 wherein the spray conduit is adjustably mounted to the rigid conduit utilizing a first vertical rotatable pipe mounted to the rigid conduit, the first vertical rotatable pipe is in fluid communication with the rigid conduit at one end and to a directional box at the other end, and further including a horizontal rotatable pipe horizontally mounted to the directional box to enable rotation of the directional box and the horizontal rotatable pipe relative to the first vertically rotatable pipe.

4. A humidifier apparatus as set forth in claim 3 further including an on/off switch mounted to the housing enclosure, wherein the on/off switch electrically disengages the solenoid valve to the humidistat.

5. A humidifier apparatus as set forth in claim 4 including an in-line filter mounted between the solenoid valve and the input conduit, wherein the in-line filter is replaceably mounted relative to the solenoid valve to enable servicing and replacement thereof.

6. A humidifier apparatus as set forth in claim 5 including a spray head cover selectively mounted encompassing the spray head, the spray head cover defined by an elongate cylindrical cavity, wherein the cylindrical cavity includes an entrance opening, and the entrance opening includes a resilient perimeter thereabout to engage the spray conduit adjacent the spray head.

7. A humidifier apparatus as set forth in claim 6 wherein the spray head cover is formed of a sponge-like material, and includes a planar fan-like rib extending orthogonally relative to the spray head cover and aligned parallel to an axis defined by the cylindrical cavity, and further including a plurality of ribs extending from the cylindrical cavity through the fan-like rib to maintain geometric integrity of the fan-like rib.

* * * * *